United States Patent
Chekansky et al.

(10) Patent No.: US 9,709,067 B2
(45) Date of Patent: Jul. 18, 2017

(54) METHOD FOR JOINING BEARING HOUSING SEGMENTS OF A TURBOCHARGER INCORPORATING AN ELECTRIC MOTOR

(71) Applicant: BorgWarner Inc., Auburn Hills, MI (US)

(72) Inventors: Jason W. Chekansky, Asheville, NC (US); Robert T. Race, Arden, SC (US)

(73) Assignee: BorgWarner Inc., Auburn Hills, MI (US)

( * ) Notice: Subject to any disclaimer, the term of this patent is extended or adjusted under 35 U.S.C. 154(b) by 125 days.

(21) Appl. No.: 14/442,010

(22) PCT Filed: Nov. 4, 2013

(86) PCT No.: PCT/US2013/068239
§ 371 (c)(1),
(2) Date: May 11, 2015

(87) PCT Pub. No.: WO2014/074437
PCT Pub. Date: May 15, 2014

(65) Prior Publication Data
US 2015/0300362 A1    Oct. 22, 2015

Related U.S. Application Data

(60) Provisional application No. 61/725,165, filed on Nov. 12, 2012.

(51) Int. Cl.
*F02B 33/44* (2006.01)
*F04D 29/056* (2006.01)
(Continued)

(52) U.S. Cl.
CPC ......... *F04D 29/0563* (2013.01); *F01D 25/16* (2013.01); *F01D 25/36* (2013.01);
(Continued)

(58) Field of Classification Search
CPC .......... F01D 25/16; F01D 25/36; F02B 39/10; F04D 29/0563; F05D 2220/40; F16C 2360/24; F16C 33/1025
See application file for complete search history.

(56) References Cited

U.S. PATENT DOCUMENTS 4,256,441 A    3/1981  Arora
4,314,705 A *  2/1982  Shimizu ................ F01D 11/003
                                                    277/346
(Continued)

FOREIGN PATENT DOCUMENTS

CN      201627605 U    11/2010
JP      2005120927     5/2005

OTHER PUBLICATIONS

CN201627605 Translation; Yaqian Liu; Nov. 10, 2010.*
(Continued)

*Primary Examiner* — Jesse Bogue
(74) *Attorney, Agent, or Firm* — Perkins Coie LLP

(57) ABSTRACT

A bearing housing (12) for a turbocharger (10) includes a split (60) defining a first bearing housing segment (62) and a second bearing housing segment (64). At least one channel (74, 84) for transporting fluid within the bearing housing (12) crosses the split (60) such that the channel (74, 84) extends within the first bearing housing segment (62) and the second bearing housing segment (64). A dowel (82, 92) having a hollow interior is inserted in the channel (74, 84) to align the first and second bearing housing segments (62, 64) and allows fluid to flow through the channel (74, 84).

15 Claims, 3 Drawing Sheets

(51) Int. Cl.
*F01D 25/16* (2006.01)
*F01D 25/36* (2006.01)
*F02B 39/10* (2006.01)
*F16C 33/10* (2006.01)

(52) U.S. Cl.
CPC .......... *F02B 39/10* (2013.01); *F05D 2220/40* (2013.01); *F16C 33/1025* (2013.01); *F16C 2360/24* (2013.01)

(56) References Cited

U.S. PATENT DOCUMENTS

| | | | | |
|---|---|---|---|---|
| 4,358,253 | A * | 11/1982 | Okano | F01D 25/166 384/368 |
| 4,376,617 | A * | 3/1983 | Okano | F01D 25/14 415/178 |
| 4,418,923 | A * | 12/1983 | Halabiya | F16J 15/025 277/591 |
| 4,458,903 | A * | 7/1984 | Tohill | E21B 34/16 166/75.11 |
| 5,025,629 | A * | 6/1991 | Woollenweber | F01D 17/141 415/160 |
| 6,943,468 | B2 * | 9/2005 | Iida | H02K 1/28 310/261.1 |
| 9,222,366 | B2 * | 12/2015 | Hornbach | F01D 25/183 |
| 2002/0076336 | A1 | 6/2002 | Mruk et al. | |
| 2010/0284824 | A1 | 11/2010 | Hippen et al. | |
| 2011/0223011 | A1 | 9/2011 | Boning et al. | |
| 2012/0038152 | A1 * | 2/2012 | Loebig | F01D 25/28 285/411 |

OTHER PUBLICATIONS

Chinese Patent Application No. 201380057747.4, Office Action, 21 pages, May 31, 2016.

International Application No. PCT/US2013/068239, International Search Report & Written Opinion, 7 pages, Feb. 17, 2014.

* cited by examiner

METHOD FOR JOINING BEARING HOUSING SEGMENTS OF A TURBOCHARGER INCORPORATING AN ELECTRIC MOTOR

CROSS-REFERENCE TO RELATED APPLICATION

This application claims priority to and all benefits of U.S. Provisional Application No. 61/725,165, filed on Nov. 12, 2012, and entitled "Method For Joining Bearing Housing Segments Of A Turbocharger Incorporating an Electric Motor."

BACKGROUND OF THE INVENTION

1. Field of the Invention

This invention relates to a bearing housing for a turbocharger incorporating an electric motor. More particularly, this invention relates to a method for joining bearing housing segments for turbocharger incorporating an electric motor.

2. Description of Related Art

A turbocharger is a type of forced induction system used with internal combustion engines. Turbochargers deliver compressed air to an engine intake, allowing more fuel to be combusted, thus boosting an engine's power density without significantly increasing engine weight. Thus, turbochargers permit the use of smaller engines that develop the same amount of power as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of reduced emissions.

Turbochargers include a turbine housing connected to the engine's exhaust manifold, a compressor housing connected to the engine's intake manifold, and a bearing housing connecting the turbine and compressor housings together. A turbine wheel in the turbine housing is rotatably driven by an inflow of exhaust gas supplied from the exhaust manifold. A shaft is rotatably supported in the bearing housing and couples the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it compresses ambient air entering the compressor housing, thereby increasing the air mass flow rate, airflow density, and air pressure delivered to the engine's cylinders via the engine's intake manifold.

At low engine speeds, exhaust gas is supplied to the turbine wheel at a lower pressure causing the turbine wheel and compressor impeller to rotate slower, resulting in the air entering the compressor housing being compressed less, which results in a so-called "turbo-lag." In order to minimize turbo-lag and improve turbocharger efficiency, and therefore engine efficiency, it is known to incorporate an electric motor into the turbocharger. This type of turbocharger is commonly referred to as an electrical turbocompound machine or electrically assisted turbocharger. The electric motor is energized at low engine speeds to impart additional torque to the shaft of the turbocharger, which causes the turbine wheel and compressor impeller to rotate faster, increasing the air mass flow rate delivered to the engine than would otherwise be delivered by a non-electrically assisted turbocharger. The electric motor can also be used as a generator, which converts shaft work, i.e., rotation of the shaft, into electrical power. The electrical power produced by the generator can be used to run auxiliary electrical components or to augment engine power.

One example of an electric motor that is incorporated into the turbocharger is a switched reluctance motor (SRM). The principles of operation of SRMs are simple, well known, and based on reluctance torque. SRMs have a stator with concentrated windings and a rotor with no winding. In a typical electrically assisted turbocharger, the SRM is located in a motor cavity defined within the bearing housing. The rotor is integrated with or mounted on the shaft and is positioned generally between a set of shaft bearings. The stator surrounds the rotor and is secured within the bearing housing. A typical SRM may have six stator poles and four rotor poles, denoted as a "6/4 SRM." The 6/4 SRM has three phases, each phase consisting of two windings on opposite stator poles. The windings in one phase are simultaneously energized and generate a magnetic flux. The magnetic flux created by the windings follows the path of least magnetic reluctance, meaning the flux will flow through the rotor poles that are closest to the energized stator poles, thereby magnetizing those rotor poles and causing the rotor to align itself with the energized stator poles. Electromagnetic torque is produced by the tendency of the rotor poles to align with the energized stator poles. As the rotor turns, different phases will be sequentially energized to keep the rotor turning. For use as a generator, the phases are energized when the stator poles and rotor poles are separating, rather than when they are approaching.

In order to incorporate the SRM into the turbocharger, it is necessary to assemble the rotor and stator into the bearing housing. While typical bearing housings include turbine and compressor side bores which the shaft is inserted through, such bores are generally not large enough to insert the rotor and stator into the bearing housing. As such, the bearing housing must be modified in order to insert and assemble the rotor and stator into the bearing housing.

It is desirable, therefore, to provide a split bearing housing that separates into two bearing housing segments in order to insert and assemble the rotor and stator into the bearing housing. It is further desirable to provide a method of aligning and maintaining an angular orientation of the bearing housing segments relative to each other.

SUMMARY OF THE INVENTION

According to one aspect of the invention, a turbocharger includes an electric motor housed within a bearing housing. The bearing housing is split into a first bearing housing segment and a second bearing housing segment. At least one channel for transporting fluid within the bearing housing crosses the split such that a first portion of the channel extends within the first bearing housing segment and a second portion of the channel extends within the second bearing housing segment. A dowel having a hollow interior is inserted in the channel such that a first portion of the dowel is disposed in the first portion of the channel and a second portion of the dowel is disposed in the second portion of the channel. The dowel aligns the first and second bearing housing segments and allows fluid to flow through the channel from one bearing housing segment to the other bearing housing segment.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
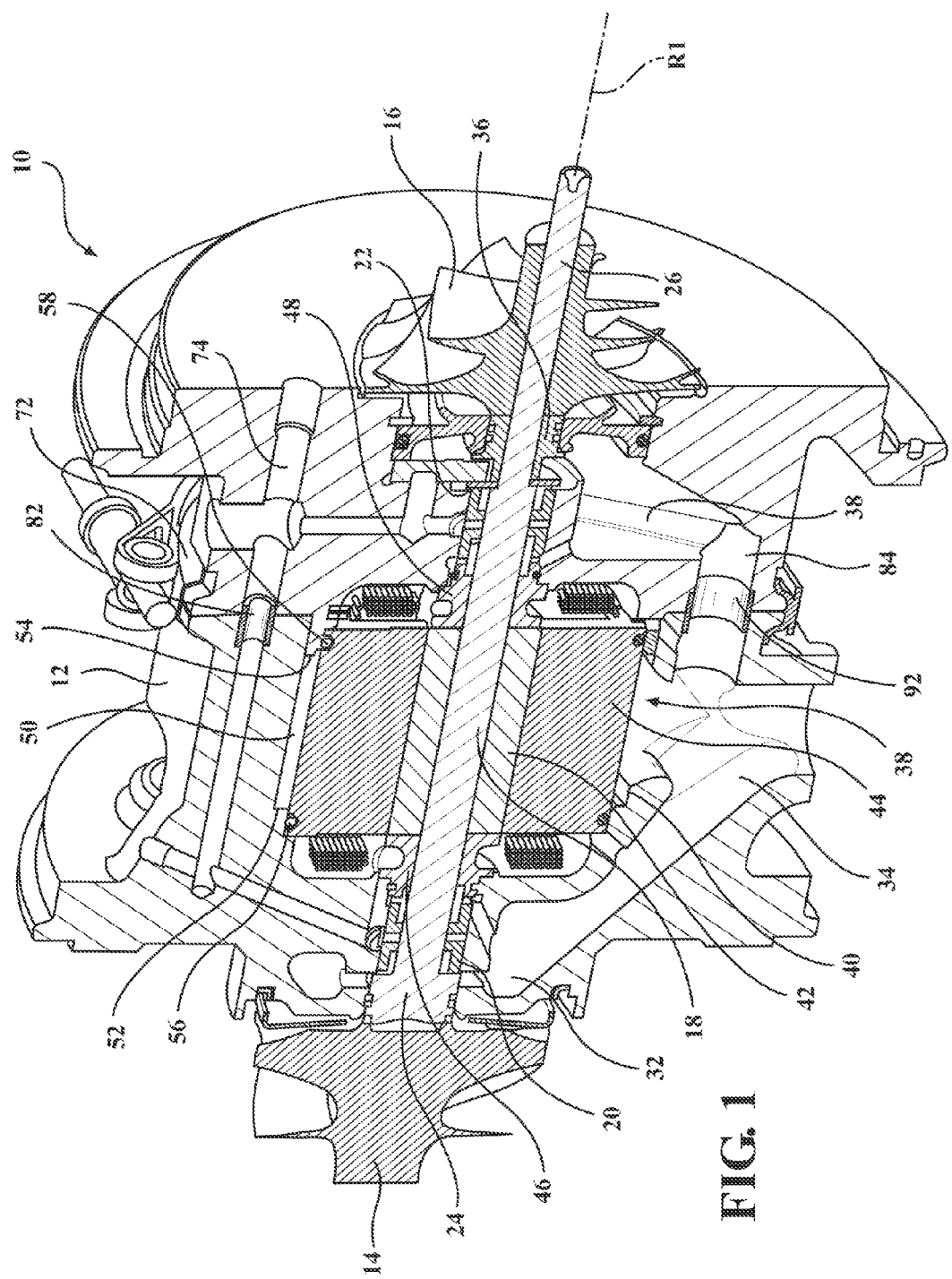
FIG. 1 is a cross-sectional view of a turbocharger including an electric motor housed within a bearing housing that is split into first and second bearing housing segments according to the invention.
Figure 2:
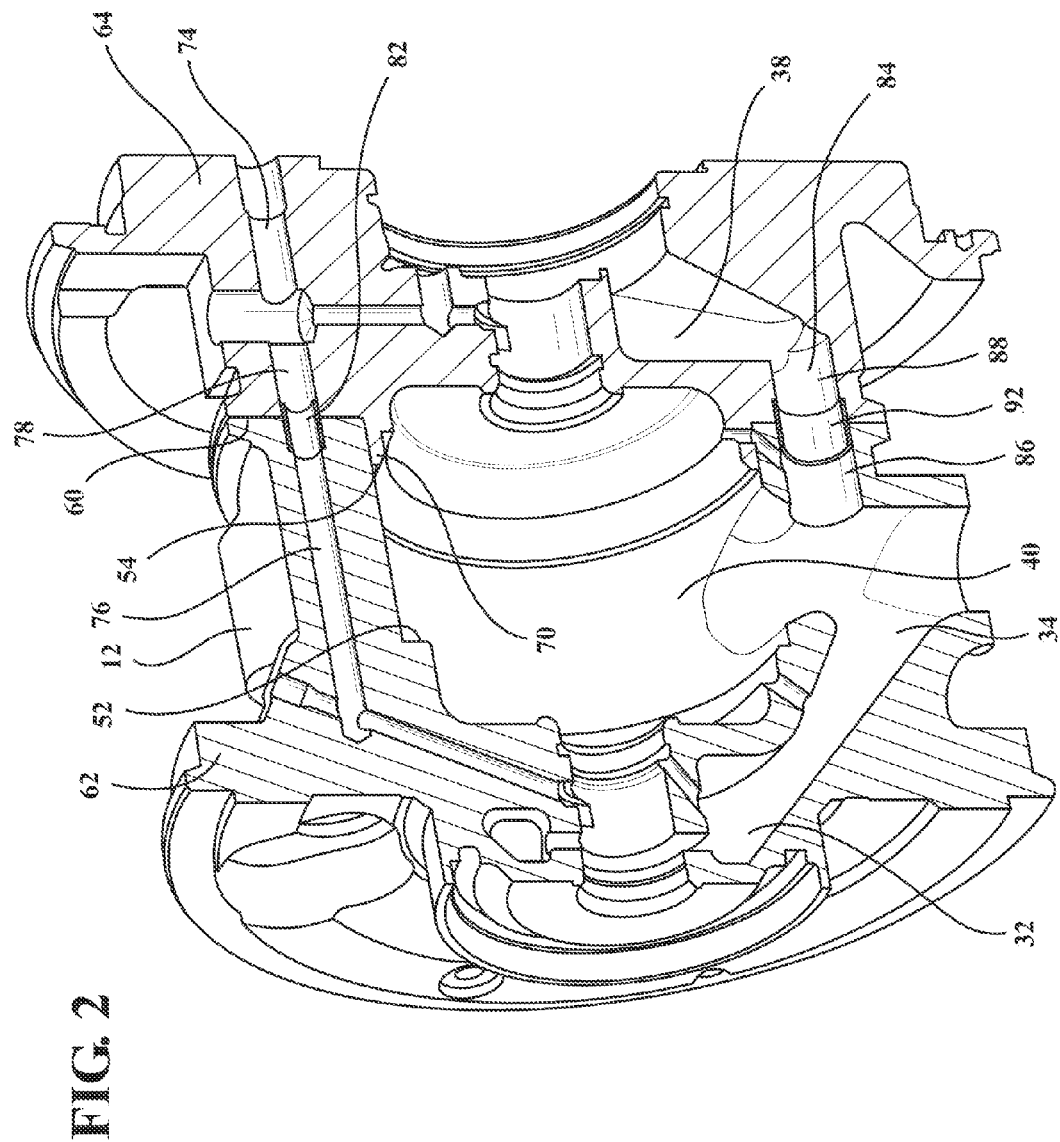
FIG. 2 is a cross-sectional view of the bearing housing without the electric motor.

Referring to the Figures, a portion of a turbocharger is illustrated generally at 10 in FIG. 1. The turbocharger 10 includes a bearing housing 12 coupled between a turbine stage and a compressor stage. The turbine stage includes a turbine wheel 14 disposed within a turbine housing (not shown) and the compressor stage includes a compressor impeller 16 disposed within a compressor housing (not shown). The turbine wheel 14 is rotatably driven by an inflow of exhaust gas supplied from an engine exhaust manifold. After driving the turbine wheel 14, the exhaust gas is discharged from the turbine housing through a central exit pipe or exducer. A shaft 18 is rotatably supported in the bearing housing 12 and connects the turbine wheel 14 to the compressor impeller 16 such that rotation of the turbine wheel 14 causes rotation of the compressor impeller 16. The shaft 18 connecting the turbine wheel 14 and the compressor impeller 16 defines an axis of rotation R1. As the compressor impeller 16 rotates, air is drawn into the compressor housing through an inlet passage and is compressed to be delivered at an elevated pressure to an engine intake manifold.

The shaft 18 is rotatably supported in the bearing housing 12 by first and second journal bearings 20, 22 that are spaced apart in an axial direction. The turbine wheel 14 is typically butt welded to one end of the shaft 18 directly adjacent to an enlarged shoulder portion 24 of the shaft 18. An opposite end of the shaft 18 has a reduced diameter portion 26 on which the compressor impeller 16 is mounted.

Oil circulates through the bearing housing 12 to provide lubrication to the first and second journal bearings 20, 22 and to remove heat that emanates from the turbine stage. On the turbine side, as the shaft 18 rotates, oil leaving the first journal bearing 20 is picked up by the shoulder portion 24 and is directed outwardly toward a first oil drain 32 which leads to an oil drain cavity 34. On the compressor side, as the shaft 18 rotates, oil leaving the second journal bearing 22 is picked up by a flinger sleeve 36 and is directed outwardly toward a second oil drain 38 which leads to the oil drain cavity 34.

An electric motor, generally shown at 38, is incorporated into the turbocharger 10. In one example, the motor may be a switched reluctance motor (SRM). It is appreciated, however, that the electric motor may be a permanent magnet type motor or some other type of electric motor without varying from the scope of the invention. The electric motor 38 is disposed in a motor chamber 40 defined within the bearing housing 12 and is positioned in the axial direction between the first and second journal bearings 20, 22. The electric motor 38 includes a rotor 42 and a stator 44. The rotor 42 is mounted on the shaft 18 and rotates therewith. The rotor 42 extends in the axial direction between first and second collars 46, 48, which are fixed to the shaft 18. The collars 46, 48 assist to transmit torque from the rotor 42 to the shaft 18 if the electric motor 38 is operating as a motor and to transmit torque from the shaft 18 to the rotor 42 if the electric motor 38 is operating as a generator. The collars 46, 48 also act as spacers between the rotor 42 and the first and second journal bearings 20, 22, respectively. The stator 44, having concentrated windings on each pole, surrounds the rotor 42 circumferentially and is mounted within the motor chamber 40 in a stationary manner.

An annular motor cooling cavity 50 is defined in a radial direction between an outer circumference of the stator 44 and an inner circumference of the bearing housing 12. The motor cooling cavity 50 extends in the axial direction between a first end 52 and a second end 54. An O-ring 56 encircles the outer circumference of the stator 44 to form an oil seal between the stator 44 and the bearing housing 12 adjacent the first end 52 of the motor cooling cavity 50. Similarly, an O-ring 58 encircles the outer circumference of the stator 44 to form an oil seal between the stator 44 and the bearing housing 12 at the second end 54 of the motor cooling cavity 50. Oil circulates through the motor cooling cavity 50 to cool the electric motor 38.

In order to assemble the electric motor 38 into the bearing housing 12, the bearing housing 12 includes a split 60 which separates the bearing housing 12 into two segments, namely, a first bearing housing segment 62 and a second bearing housing segment 64. The first bearing housing segment 62 includes a face 66 and the second bearing housing segment 64 includes a face 68. The faces 66, 68 of the first and second bearing housing segments 62, 64 are generally parallel and are in direct abutting contact when the first and second bearing housing segments 62, 64 are assembled. In addition, the second bearing housing segment 64 includes a collar 70 having an outer circumference. The collar 70 extends in the axial direction and protrudes from the face 68 of the second bearing housing segment 64. When the first and second bearing housing segments 62, 64 are assembled, the collar 70 is received within and directly contacts an inner circumference of the first bearing housing segment 62. As such, the first end 52 of the motor cooling cavity 50 is defined by the first bearing housing segment 62 and the second end 54 of the motor cooling cavity 50 is defined by the collar 70 of the second bearing housing segment 64.

The first and second bearing housing segments 62, 64 are secured together by a clamp 72 with a circular shape that extends around an outer circumference of the bearing housing 12 and is aligned in the axial direction with the split 60. The clamp 72 is usually flexible or expandable and may have a V-shaped cross-section that acts to force the first and second bearing housing segments 62, 64 toward each other upon tensioning the clamp 72. The clamp 72 may be a V-band clamp as is well known in the art. It is contemplated that the first and second bearing housing segments 62, 64 may be secured together by a plurality of bolts or some other suitable method. It is further contemplated that the bearing housing 12 having the first and second bearing housing segments 62, 64, as disclosed herein, may be used with a turbocharger that does not include an electric motor, without varying from the scope of the invention.

Figure 3:
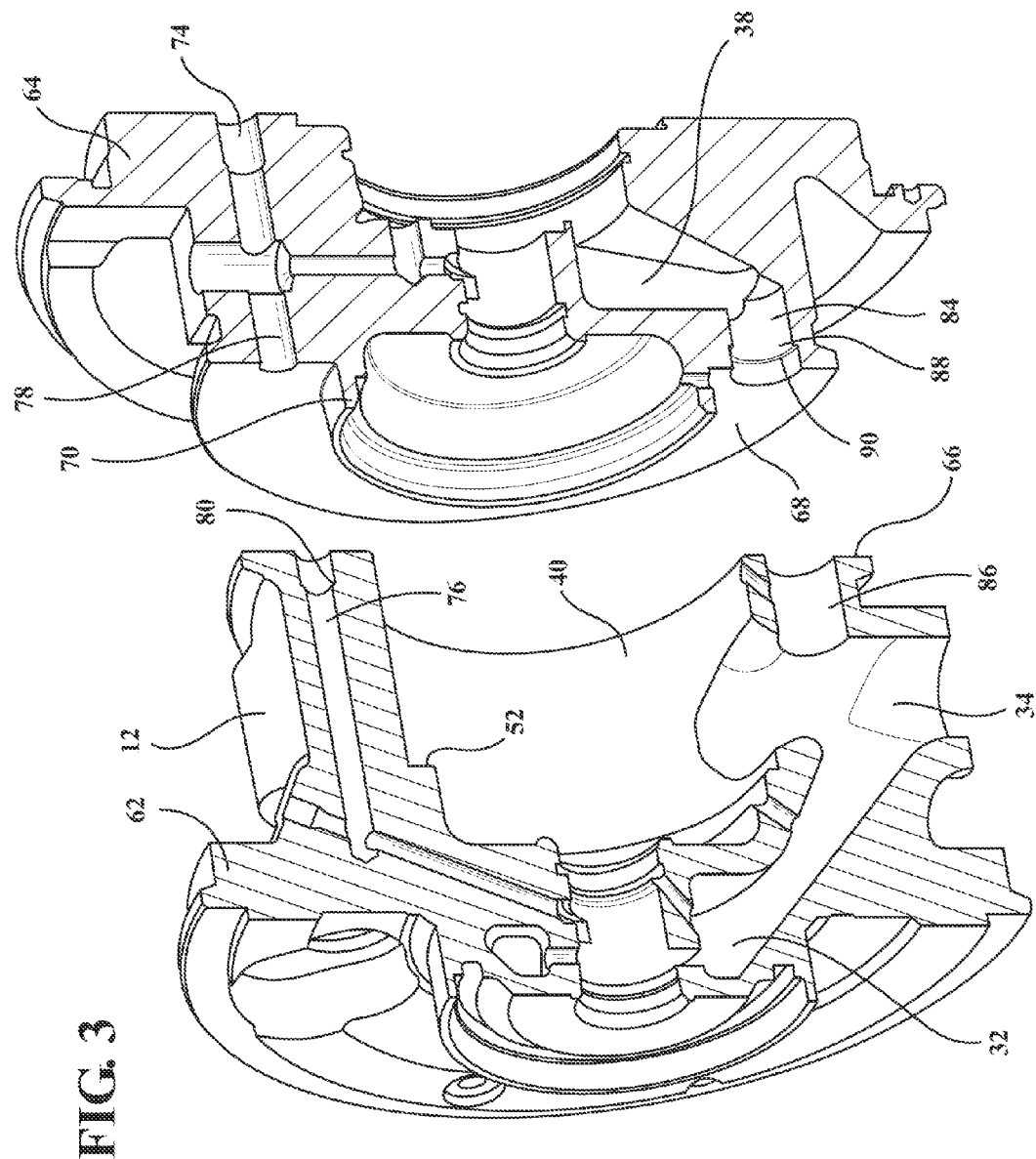
FIG. 3 is a cross-sectional view of the bearing housing illustrating the first and second bearing housing segments in a disassembled state.

In the present embodiment, at least one channel is formed within the bearing housing 12 to transport a liquid across the split 60. For example, an oil supply channel 74 extends within the first and second bearing housing segments 62, 64 and crosses the split 60. Specifically, the oil supply channel 74 includes a first supply portion 76 extending within the first bearing housing segment 62 and a second supply portion 78 extending within the second bearing housing segment 64. The first supply portion 76 includes a step 80 in the diameter of the oil supply channel 74, best seen in FIG. 3. It is appreciated, however, that the step 80 may be located in either of the first or second supply portions 76, 78 of the oil supply channel 74 without varying from the scope of the invention. A first dowel 82 having a hollow interior is inserted into the oil supply channel 74 with a first portion of the first dowel 82 disposed in the first supply portion 76 and a second portion of the first dowel 82 disposed in the second supply portion 78. More specifically, one end of the first dowel 82 is seated against the step 80 in the first supply portion 76 to position the first dowel 82 within the oil supply channel 74 in the axial direction. The first dowel 82 aligns the first and second bearing housing segments 62, 64 and maintains an angular orientation of the first and second bearing housing segments 62, 64 relative to each other. The first dowel 82 allows oil or some other liquid to flow unimpeded through the oil supply channel 74 from the second bearing housing segment 64 to the first bearing housing segment 62, or vice versa.

Similarly, at least one oil drain channel 84 extends within the first and second bearing housing segments 62, 64 and crosses the split 60. Specifically, the oil drain channel 84 includes a first drain portion 86 extending within the first bearing housing segment 62 and a second drain portion 88 extending within the second bearing housing segment 64. The second drain portion 88 includes a step 90 in the diameter of the oil drain channel 84, best seen in FIG. 3. It is appreciated, however, that the step 90 may be located in either of the first or second drain portions 86, 88 of the oil drain channel 84 without varying from the scope of the invention. A second dowel 92 having a hollow interior is inserted into the oil drain channel 84 with a first portion of the second dowel 92 disposed in the first drain portion 86 and a second portion of the second dowel 92 disposed in the second drain portion 88. More specifically, one end of the second dowel 92 is seated against the step 90 in the second drain portion 88 to position the second dowel 92 within the oil drain channel 84 in the axial direction. The second dowel 92 also aligns the first and second bearing housing segments 62, 64 and maintains an angular orientation of the first and second bearing housing segments 62, 64 relative to each other. The second dowel 92 allows oil or some other liquid to flow unimpeded through the oil drain channel 84 from the second bearing housing segment 64 to the first bearing housing segment 62, or vice versa.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A bearing housing (12) for a turbocharger (10), said bearing housing (12) comprising:
   a first bearing housing segment (62) and a second bearing housing segment (64), said first and second bearing housing segments (62, 64) defining a split (60);
   at least one channel (74, 84) for transporting fluid within said bearing housing (12), wherein said at least one channel (74, 84) crosses said split (60); and
   a dowel (82, 92) having a hollow interior inserted in said at least one channel (74, 84), wherein said dowel (82, 92) aligns said first and second bearing housing segments (62, 64) and maintains an angular orientation of the first and second bearing housing segments, and allows fluid to flow through said at least one channel (74, 84).

2. The bearing housing (12) as set forth in claim 1 wherein a first portion (76, 86) of said at least one channel (74, 84) extends within said first bearing housing segment (62) and a second portion (78, 88) of said at least one channel (74, 84) extends within said second bearing housing segment (64), and wherein a first portion of said dowel (82, 92) is disposed in said first portion (76, 86) of said at least one channel (74, 84) and a second portion of said dowel (82, 92) is disposed in said second portion (78, 88) of said at least one channel (74, 84).

3. The bearing housing (12) as set forth in claim 2 wherein said second bearing housing segment (64) includes a collar (70) having a circumference such that said collar (70) is received within and directly contacts an inner circumference of said first bearing housing segment (62).

4. The bearing housing (12) as set forth in claim 3 wherein said collar (70) extends in an axial direction and protrudes from a face (68) of said second bearing housing segment (64), said face (68) of said second bearing housing segment (64) is generally parallel to and directly abutting a face (66) of said first bearing housing segment (62).

5. The bearing housing (12) as set forth in claim 4 including a clamp (72) securing said first and second bearing housing segments (62, 64) together, wherein said clamp (72) extends around an outer circumference of said bearing housing (12) and is aligned in said axial direction with said split (60).

6. The bearing housing (12) as set forth in claim 5 wherein one of said first and second portions (76, 78, 86, 88) of said at least one channel (74, 84) includes a step (80, 90) in a diameter of said at least one channel (74, 84), and wherein said dowel (82, 92) is seated against said step (80, 90), thereby positioning said dowel (82, 92) within said at least one channel (74, 84) in said axial direction.

7. The bearing housing (12) as set forth in claim 5 wherein a first portion (76) of a first channel (74) includes a step (80) in a diameter of said first channel (74), and wherein a first dowel (82) is seated against said step (80), thereby positioning said first dowel (82) within said first channel (74) in said axial direction.

8. The bearing housing (12) as set forth in claim 7 wherein a second portion (88) of a second channel (84) includes a step (90) in a diameter of said second channel (84), and wherein a second dowel (92) is seated against said step (90), thereby positioning said second dowel (92) within said second channel (84) in said axial direction.

9. A turbocharger (10) including an electric motor (38), said turbocharger (10) comprising:
   a bearing housing (12) having a split (60) defining a first bearing housing segment (62) and a second bearing housing segment (64), wherein said bearing housing (12) defines a motor cooling cavity (50) between an outer circumference of the motor (38) and an inner circumference of said bearing housing (12);
   at least one channel (74, 84) for transporting fluid within said bearing housing (12), wherein said at least one channel (74, 84) crosses said split (60); and
   a dowel (82, 92) having a hollow interior inserted in said at least one channel (74, 84), wherein said dowel (82, 92) aligns said first and second bearing housing segments (62, 64) and maintains an angular orientation of the first and second bearing housing segments, and allows fluid to flow through said at least one channel (74, 84).

10. The turbocharger (10) as set forth in claim 9 wherein a first portion (76, 86) of said at least one channel (74, 84) extends within said first bearing housing segment (62) and a second portion (78, 88) of said at least one channel (74, 84) extends within said second bearing housing segment (64), and wherein a first portion of said dowel (82, 92) is disposed in said first portion (76, 86) of said at least one channel (74, 84) and a second portion of said dowel (82, 92) is disposed in said second portion (78, 88) of said at least one channel (74, 84).

11. The turbocharger (10) as set forth in claim 10 wherein said second bearing housing segment (64) includes a collar (70) having a circumference such that said collar (70) is received within and directly contacts an inner circumference of said first bearing housing segment (62).

12. The turbocharger (10) as set forth in claim 11 wherein said collar (70) extends in an axial direction and protrudes from a face (68) of said second bearing housing segment (64), said face (68) of said second bearing housing segment (64) is generally parallel to and abutting a face (66) of said first bearing housing segment (62).

13. The turbocharger (10) as set forth in claim 12 wherein said motor cooling cavity (50) extends in said axial direction between a first end (52) and a second end (54), said first end (52) of said motor cooling cavity (50) is defined by said first bearing housing segment (62) and said second end (54) of said motor cooling cavity (50) is defined by said second bearing housing segment (64).

14. The turbocharger (10) as set forth in claim 13 including a clamp (72) securing said first and second bearing housing segments (62, 64) together, wherein said clamp (72) extends around an outer circumference of said bearing housing (12) and is aligned in said axial direction with said split (60).

15. The turbocharger (10) as set forth in claim 14 wherein one of said first and second portions (76, 78, 86, 88) of said at least one channel (74, 84) includes a step (80, 90) in a diameter of said at least one channel (74, 84), and wherein said dowel (82, 92) is seated against said step (80, 90), thereby positioning said dowel (82, 92) within said at least one channel (74, 84) in said axial direction.

* * * * *